(12) United States Patent
Imber et al.

(10) Patent No.: US 9,607,429 B2
(45) Date of Patent: Mar. 28, 2017

(54) RELIGHTABLE TEXTURE FOR USE IN RENDERING AN IMAGE

(71) Applicant: Imagination Technologies Limited, Hertfordshire (GB)

(72) Inventors: James Imber, Hertfordshire (GB); Adrian Hilton, Guildford (GB)

(73) Assignee: Imagination Technologies Limited, Kings Langley (GB)

( * ) Notice: Subject to any disclaimer, the term of this patent is extended or adjusted under 35 U.S.C. 154(b) by 134 days.

(21) Appl. No.: 14/121,221

(22) Filed: Aug. 13, 2014

(65) Prior Publication Data
US 2015/0356769 A1 Dec. 10, 2015

(30) Foreign Application Priority Data
Jun. 4, 2014 (GB) .................................. 1409916.2

(51) Int. Cl.
 *G06T 15/50* (2011.01)
 *G06T 15/80* (2011.01)
 (Continued)

(52) U.S. Cl.
 CPC .............. *G06T 15/80* (2013.01); *G06T 7/403* (2013.01); *G06T 7/407* (2013.01); *G06T 7/408* (2013.01);
 (Continued)

(58) Field of Classification Search
 CPC ..... G06T 15/503; G06T 15/506; G06T 15/80; G06T 19/20; G06T 2207/10004; G06T 2207/10016; G06T 2207/10024; G06T 2207/20016; G06T 2207/20021; G06T 2207/20028; G06T 7/403; G06T 7/407; G06T 7/408; G06T 7/602; G06T 7/604
 See application file for complete search history.

(56) References Cited

FOREIGN PATENT DOCUMENTS

| JP | 2005228112 A | 8/2005 |
|---|---|---|
| JP | 2007226576 A | 9/2007 |

OTHER PUBLICATIONS

Derek Hoiem, Alexei A. Efros and Martial Hebert, "Recovering Surface Layout from an Image", Feb. 2007, International Journal of Computer Vision 75(1), 151-172.*

(Continued)

*Primary Examiner* — Sing-Wai Wu
(74) *Attorney, Agent, or Firm* — Vorys, Sater, Seymour and Pease LLP; Vincent M DeLuca

(57) ABSTRACT

Relightable free-viewpoint rendering allows a novel view of a scene to be rendered and relit based on multiple views of the scene from multiple camera viewpoints. An initial texture can be segmented into materials and an initial coarse color estimate is determined for each material. Scene geometry is estimated from the captured views of the scene and is used to scale the initial coarse color estimates relative to each other such that the different materials appear to be lit with a similar irradiance. In this way, a global irradiance function is estimated describing the scene illumination. This provides a starting point for a color estimate and shading estimate extraction. The shading estimate can be used to fit surface normals to the global irradiance function. The set of surface normals and the color estimate are stored for subsequent use to allow relighting of the scene.

20 Claims, 9 Drawing Sheets
(3 of 9 Drawing Sheet(s) Filed in Color)

(51) Int. Cl.
- *G06T 7/40* (2006.01)
- *G06T 7/60* (2017.01)
- *G06T 19/20* (2011.01)
- *G06T 15/04* (2011.01)

(52) U.S. Cl.
CPC .............. *G06T 7/602* (2013.01); *G06T 7/604* (2013.01); *G06T 15/04* (2013.01); *G06T 15/50* (2013.01); *G06T 15/503* (2013.01); *G06T 15/506* (2013.01); *G06T 19/20* (2013.01); *G06T 2207/10004* (2013.01); *G06T 2207/10016* (2013.01); *G06T 2207/10024* (2013.01); *G06T 2207/20016* (2013.01); *G06T 2207/20021* (2013.01); *G06T 2207/20028* (2013.01)

(56) References Cited

OTHER PUBLICATIONS

F. Melendez, M. Glencross, G. J. Ward and R. J. Hubbold, "Relightable Buildings from Images", 2011, Eurographics 2011.*
Mukaigawa Y. et al., "Color blending based on viewpoint and surface normal for generating images from any viewpoint using multiple cameras", 2003, IEEE Conf. on Multisensor Fusion and Integration for Intelligent Systems, Jul.-Aug. 2003, Tokyo, pp. 95-100.
GB Application No. GB1409916.2 Search Report dated Dec. 3, 2014.
Debevec et al., Acquiring the Reflectance Field of a Human Face, SIGGRAPH 2000 Conference Proceedings, Jul. 23-28, 2000, pp. 145-156, SIGGRAPH 2000, New Orleans, LA.
Ahmed et al., Spatio-temporal Reflectance Sharing for Relightable 3D Video, Computer Vision/Computer Graphics Collaboration Techniques: Third Int'l Conference MIRAGE 2007, pp. 47-58, Springer, Berlin, Germany, 2007.
Baron et al., Shape, Albedo, and Illumination from a Single Image of an Unknown Object, 2012 IEEE Conference on Computer Vision and Pattern Recognition (CVPR), pp. 334-341.
Baron et al., Intrinsic Scene Properties from a Single RGB-D Image, 2013 IEEE Conference on Computer Vision and Pattern Recognition (CVPR), pp. 17-24.
Barrow et al., Recovering Intrinsic Scene Characteristics from Images, Computer Vision Systems, A Hanson & E. Riseman (Eds.), pp. 3-26, New York: Academic Press (1978).
Bousseau et al., User-Assisted Intrinsic Images, ACM Transactions on Graphics, vol. 28, No. 5, Article 130, Dec. 2009.
Einarsson et al., Relighting Human Locomotion with Flowed Reflectance Fields, Eurographics Symposium on Rendering (2006), Tomas Akenine-Möller and Wolfgang Heidrich (Editors).
Felzenszwalb et al., Efficient Graph-Based Image Segmentation, International Journal of Computer Vision 59(2), 167-181, 2004, Kluwer Academic Publishers, Netherlands.
Guillemaut et al., Joint Multi-Layer Segmentation and Reconstruction for Free-Viewpoint Video Applications, Dec. 21, 2010, Springer Science+Business Media.
Zitnick et al., High-quality video view interpolation using a layered representation, ACM SIGGRAPH, vol. 23, No. 3, pp. 600-608, Aug. 2004.
Debevec et al, Image-Based Modeling and Rendering of Architecture With Interactive Photogrammetry and View-Dependent Texture Mapping, Circuits and Systems, 1998. ISCAS '98.
Land et al., Lightness and Retinex Theory, Journal of the Optical Society of America, vol. 61, No. 1, pp. 1-11, Jan. 1971.
Lensch et al., Image-Based Reconstruction of Spatial Appearance and Geometric Detail, ACM Transactions on Graphics, vol. 22, No. 2, Apr. 2003, pp. 234-257.
Li et al., Capturing Relightable Human Performances under General Uncontrolled Illumination, EUROGRAPHICS 2013, vol. 32, No. 2.
Matusik et al., Image-Based 3D Photography Using Opacity Hulls, ACM Transactions on Graphics 21(3): 427-437, Jul. 2002.
Debevec et al., Modeling and Rendering Architecture fromPhotographs: A hybrid geometry- and image-based approach, SIGGRAPH 1996 Conference Proceedings.
Ramamoorthi et al., On the relationship between radiance and irradiance: determining the illumination from images of a convex Lambertian object, J. Opt.Soc. Am. A/vol. 18, No. 10, Oct. 2001, pp. 2448-2459.
Shen et al., Intrinsic Images Using Optimization, IEEE Conference onComputer Vision and Pattern Recognition (CVPR), 2011, pp. 3481-3487.
Starck et al., Surface Capture for Performance-Based Animation, IEEE Computer Graphics and Applications, May 2007, pp. 21-31.
Starck et al., A Free-Viewpoint Video Renderer, Journal of Graphics,GPU, and Game Tools, vol. 14, No. 3: 57-72, Jan. 2010.
Tappen et al., Recovering Intrinsic Images from a Single Image,IEEE Transactions on Pattern Analysis and Machine Intelligence, vol. 27, Issue 9, 1459-1472, Sep. 2005.
Vedula et al., Image-Based Spatio-Temporal Modeling and View Interpolation of Dynamic Events, ACM Transactions on Graphics, vol. 24, No. 2, Apr. 2005, pp. 240-261.
Wu et al., Shading-based Dynamic Shape Refinement from Multi-view Video underGeneral Illumination, IEEEInternational Conference on Computer Vision (ICCV), pp. 1108-1115, 2011.

* cited by examiner

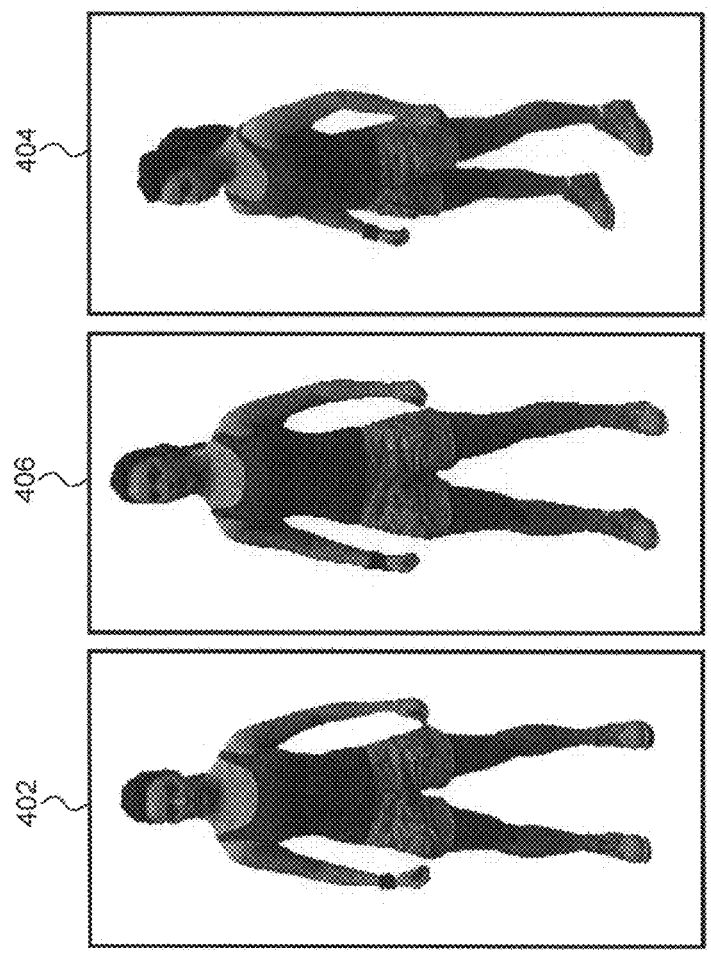

RELIGHTABLE TEXTURE FOR USE IN RENDERING AN IMAGE

BACKGROUND

An image may represent a view of a scene as captured from the viewpoint of a camera. In some cases there may be more than one camera capturing different views of a scene. However, there will be some viewpoints of the scene which do not correspond to any of the camera viewpoints. The image may be a frame of a video sequence. Techniques such as Free-viewpoint video rendering (FVVR) allow a novel view of a scene to be generated based on a set of multiple views of the scene from multiple camera viewpoints. The cameras are preferably calibrated and synchronized with each other so that the views of the scene can be combined correctly.

Based on the different views of the scene, a model of the scene geometry may be constructed, for example using Multiple-View Stereo (MVS), and a texture may be formed which can be applied to the model. The texture can be formed by projectively texturing the scene geometry with the original images and blending the projected images. The model, with the texture, can then be used to render the scene from a rendering viewpoint which may, or may not, be the same as one of the camera viewpoints. As well as recreating a "real-world" scene from a rendering viewpoint, the content of the real-world scene may be mixed with computer-generated content.

There are a number of issues which may need to be considered when generating a novel viewpoint of a scene. For example, relighting of the scene can be difficult. Textures extracted from images (e.g. frames of a video sequence) captured by cameras have implicit real-world lighting information, such that lighting artifacts are present (i.e. "baked-in") in the textures.

One way of addressing the problem of how to relight the textures for a novel viewpoint is to control the lighting of the scene at the time when the cameras capture the different views of the scene. For example, diffuse lighting can be used in the initial video capture to avoid creating excess shaded areas and specularities that will damage the plausibility of the scenes rendered using extracted textures. The effects of lighting changes may be automatically addressed, but this may require an active lighting arrangement, in which the scene is captured under a variety of calibrated lighting conditions, in order to deduce the material properties of the textures. However, relighting scenes with arbitrary lighting arrangements is considerably more challenging. Similar challenges apply to relighting textures with arbitrary lighting arrangements irrespective of how the textures were formed from captured images of scenes, for example when only one camera is used to capture an image of a scene from a single camera viewpoint and/or when the rendering viewpoint is the same as one of the camera viewpoints.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of determining a colour component of a relightable texture and a set of surface normals for use in rendering an image from a rendering viewpoint under arbitrary lighting conditions, wherein at least one view of a scene from a respective at least one camera viewpoint represents the image, the method comprising: analysing the at least one view of the scene to estimate scene geometry and to segment an initial texture into a plurality of materials, the initial texture being separable into a colour estimate and a corresponding shading estimate; determining an initial coarse colour estimate for each of the materials; determining one or more scale factors, for scaling a respective one or more of the initial coarse colour estimates, the scale factors being determined based on differences between irradiance estimates determined for the materials based on shading estimates which correspond with scaled versions of the initial coarse colour estimates of the materials; determining a global irradiance function for the scene using the determined scale factors; using the global irradiance function and the initial texture to determine a further colour estimate and a corresponding further shading estimate, wherein the further colour estimate represents the colour component of the relightable texture; and determining the set of surface normals using the global irradiance function and the further shading estimate.

There is also provided an image processing apparatus configured to determine a colour component of a relightable texture and a set of surface normals for use in rendering an image from a rendering viewpoint under arbitrary lighting conditions, wherein at least one view of a scene from a respective at least one camera viewpoint represents the image, the image processing apparatus comprising: scene analysis logic configured to analyse the at least one view of the scene to estimate scene geometry and to segment an initial texture into a plurality of materials, the initial texture being separable into a colour estimate and a corresponding shading estimate; coarse colour estimation logic configured to determine an initial coarse colour estimate for each of the materials; scale factor determination logic configured to determine one or more scale factors, for scaling a respective one or more of the initial coarse colour estimates, the scaling logic being configured to determine the scale factors based on differences between irradiance estimates determined for the materials based on shading estimates which correspond with scaled versions of the initial coarse colour estimates of the materials; global irradiance determination logic configured to determine a global irradiance function for the scene using the determined scale factors; texture separation logic configured to use the global irradiance function and the initial texture to determine a further colour estimate and a corresponding further shading estimate, wherein the further colour estimate represents the colour component of the relightable texture; and surface normal determination logic configured to determine the set of surface normals using the global irradiance function and the further shading estimate.

There is also provided an image processing system configured to determine a colour component of a relightable texture and a set of surface normals for use in rendering an image from a rendering viewpoint under arbitrary lighting conditions, wherein at least one view of a scene from a respective at least one camera viewpoint represents the image, the image processing system comprising a processing block configured to: analyse the at least one view of the scene to estimate scene geometry and to segment an initial texture into a plurality of materials, the initial texture being separable into a colour estimate and a corresponding shading estimate; determine an initial coarse colour estimate for each of the materials; determine one or more scale factors, for scaling a respective one or more of the initial coarse colour estimates, the scale factors being determined based on differences between irradiance estimates determined for the materials based on shading estimates which correspond with scaled versions of the initial coarse colour estimates of the materials; determine a global irradiance function for the scene using the determined scale factors; use the global irradiance function and the initial texture to determine a further colour estimate and a corresponding further shading estimate, wherein the further colour estimate represents the colour component of the relightable texture; and determine the set of surface normals using the global irradiance function and the further shading estimate.

There may also be provided a computer program product configured to determine a colour component of a relightable texture and a set of surface normals for use in rendering an image from a rendering viewpoint under arbitrary lighting conditions, the computer program product being embodied on a computer-readable storage medium and configured so as when executed on a processor to perform the method of any of the examples described herein. Furthermore, there may also be provided a computer readable storage medium having encoded thereon computer readable program code for generating a processing block configured to perform the method of any of the examples described herein.

The above features may be combined as appropriate, as would be apparent to a skilled person, and may be combined with any of the aspects of the examples described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Examples will now be described in detail with reference to the accompanying drawings in which:

FIG. 3b shows a more detailed view of some of the steps of the flowchart shown in FIG. 3a;

FIG. 4 shows two views of a scene from two camera viewpoints, and shows a rendered image for the scene from a rendering viewpoint;

FIG. 5b shows irradiance estimates as projections of the shading estimates for the two materials shown in FIG. 5a;

Figure 1:
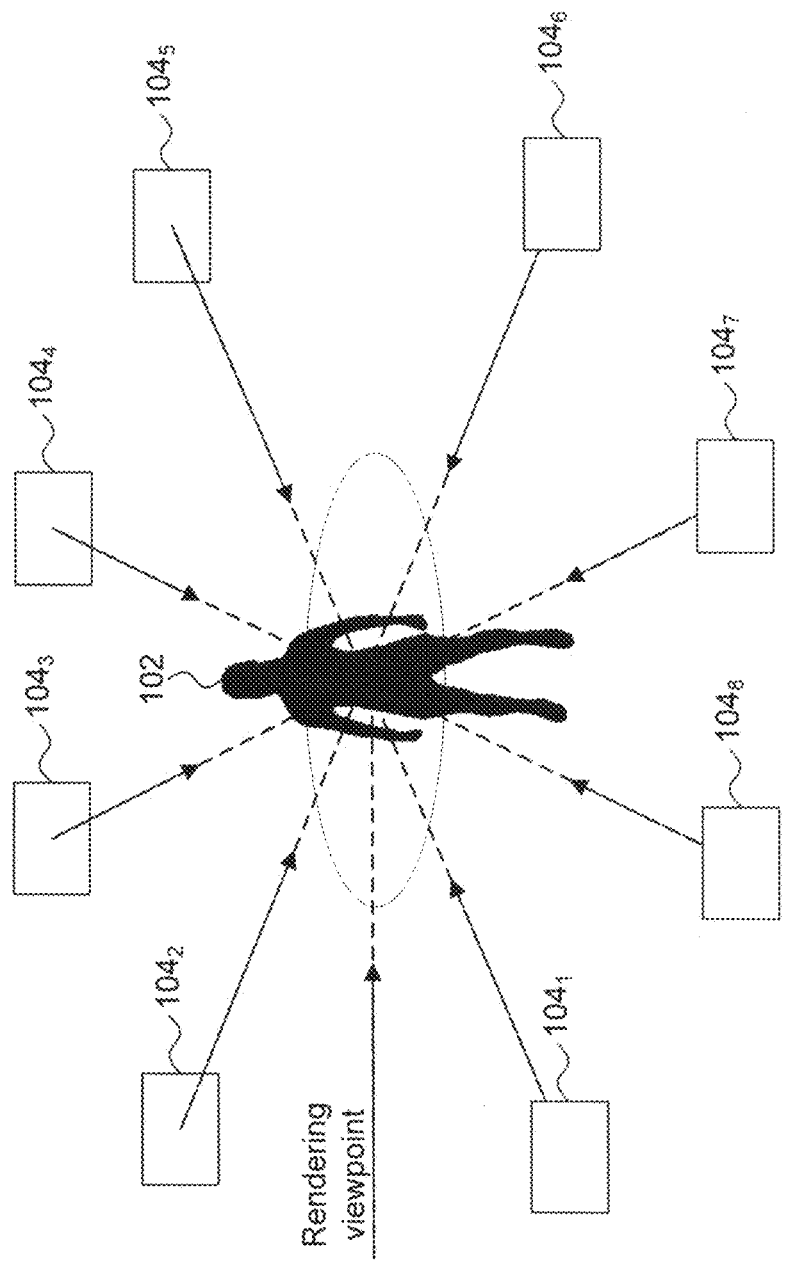
FIG. 1 represents an arrangement in which a plurality of cameras are arranged to capture different views of a scene.

Common reference numerals are used throughout the figures, where appropriate, to indicate similar features.

DETAILED DESCRIPTION

Embodiments will now be described by way of example only. The examples described in detail herein relate to free-viewpoint rendering, but the same principles of determining a relightable texture can be applied in other examples, e.g. in which there is only one camera (rather than multiple cameras as in free-viewpoint rendering) which can move to capture multiple views of a scene from different angles, and/or in which the rendering viewpoint is the same as a camera viewpoint.

Free-viewpoint rendering allows an image to be generated to provide a novel view of a scene based on a set of multiple views of the scene from multiple camera viewpoints. As an example, the generated image may be a frame within a generated video sequence. Free-viewpoint video rendering (FVVR) is the synthesis of novel views of a scene that changes with time, with reference to video data captured using a set of cameras. Most standard FVVR systems do not support relighting of the scene. However, examples described herein allow a scene to be relit and viewed under arbitrary lighting conditions when the scene is rendered from the novel viewpoint. For example, this can be used to relight an actor's performance for seamless compositing into arbitrary real-world and/or computer generated surroundings which may have different lighting conditions to those in which the images of the actor are captured. For example, where the image is a frame of a video sequence the examples described herein relate to "relightable FVVR". The appearance of a scene can be represented as a function of multiple parameters including: (i) the colour (which may be referred to as "albedo") of objects in the scene, (ii) the surface normals of the surfaces of objects in the scene, (iii) the specularity of surfaces in the scene, and (iv) the scene lighting. In methods described herein, colour estimates and surface normals are determined for use in rendering an image from a rendering viewpoint under arbitrary lighting conditions. It is not a simple problem to separate the appearance of a scene into the four parameters, in particular if the scene lighting in which the images of the scene are captured is unknown. For example, it is not trivial to determine the difference between a surface that has a bright intrinsic colour but is poorly lit and a surface that is well lit but has a darker intrinsic colour. That is, there may be an ambiguity between shading and albedo.

The concept of irradiance is used in the examples described herein. Irradiance is a measure of the total power incident on a surface per unit area, and may be measured in watts per square meter. Irradiance is a similar concept to radiance. Radiance is the power of radiation incident on a surface per unit area of the surface and per unit solid angle in the direction of the incident radiation, such that radiance may be measured in watts per steradian per square meter. A relationship can be used to relate the irradiance to the radiance in a scene. For example, the global scene irradiance may be reconstructed assuming Lambertian reflectance and infinitely displaced lighting. The Lambertian reflectance model relates irradiance (L) to the radiance (R) as shown in the following equation:

$$L(n(x),x) = \int_\Omega \max(u(\zeta,\phi)^T n(x), 0) R(\theta,\phi) V(\theta,\phi,x) d\Omega.$$

where $u(\theta, \phi)$ is a unit vector in the direction of the spherical polar co-ordinates $(\theta, \phi)$ and $n(x)$ is the surface normal at a surface position x. As described in more detail below, the scene appearance $I(x)$ is related to the irradiance such that $I(x) = A(x)L(x)$, where $A(x)$ is the albedo at the position x. $V(\theta, \phi, x)$ is a visibility mask which describes whether the surface position x is visible from the direction $(\theta, \phi)$ and can only take a value 0 or 1. The integral is over the sphere $\Omega$ with incremental surface area $d\Omega = \sin(\theta)d\theta d\phi$. Under an assumption of a convex scene, the dependence on surface position x in equation 1 disappears, and this can be considered as a convolution of the radiance function, R(θ, φ), with a large low-pass filter, termed the clamped-cosine kernel, as represented by the following equation:

$$L(n) = \int_\Omega \max(u(\theta,\phi)^T n, 0) R(\theta,\phi) d\Omega.$$

In the methods described herein, scene geometry is estimated from the captured views of the scene, e.g. using MVS. The scene geometry is used to resolve the ambiguity between shading and albedo. In particular, an initial texture can be segmented into different materials by coarsely segmenting a mesh surface of the scene geometry into regions of similar albedo, making use of the observation that albedo is often piecewise constant. This initial segmentation does not have to be completely accurate, and an attempt to refine it is not necessary. An initial coarse colour (or "albedo") estimate is determined for each of the materials and the initial coarse colour estimates can be scaled relative to each other such that the different materials appear to be lit with a similar irradiance. In this way, a global irradiance function is estimated which describes the scene illumination which matches the shading distribution over the surface of the mesh of the scene geometry. This provides a starting point for a colour estimate and shading estimate extraction, during which per-texel values of a colour estimate and per-texel values of a shading estimate are determined. The shading estimate can then be used to fit surface normals to the global irradiance function. The set of surface normals and the colour estimate are stored and can be used subsequently to allow relighting of the scene. After the coarse colour estimate has been used to estimate the global irradiance function, the coarse colour estimate may be discarded because it is no longer needed. This is because rather than refining the coarse colour estimates to determine the per-texel colour estimate values, the global irradiance function and the initial texture are used to determine the per-texel colour estimate values.

By using the coarse colour estimate to determine the global irradiance function, the global irradiance function provides a low-frequency indication of the global scene lighting of the captured images, which does not lose any generality when applied to scenes with complex textures. In examples described herein, the global irradiance function is recovered up to second order spherical harmonics, meaning that any high-frequency variations in albedo within each segment will not corrupt the lighting estimate. As described above, once the scene lighting has been estimated, the coarse albedo estimate may be discarded, and full image-resolution colour estimates and sets of surface normals can be determined from the initial texture using the lighting estimate. This allows accurate surface detail to be retained in the colour estimates and surface normals. The set of surface normals for a scene may be referred to as a "surface normal map" of the scene.

FIG. 1 shows an object (e.g. a person 102) which is part of a scene. Eight cameras $104_1$ to $104_8$ are shown in FIG. 1 which are capturing different views of the scene from respective camera viewpoints. However, the system for capturing the views of the scene is not limited to using eight cameras and in other examples a different number of cameras (e.g. fewer than eight or more than eight cameras) may be used to capture views of the scene. In the example shown in FIG. 1 the scene comprises the person 102 in view of all eight of the cameras 104 against a plain (e.g. monochromatic) background. The images captured by the cameras 104 may be frames of a video sequence, but in other examples the cameras capture views of a scene for use in rendering an image at a single point in time, i.e. the image might not be a frame of a video sequence. In this example, the cameras are calibrated with reference to a common coordinate system, and the frames of video captured by each camera 104 are captured at synchronized timings. Furthermore, it simplifies the implementation of the image processing system if all of the cameras have the same operating parameters, e.g. the same number of pixels, the same formatting protocol, etc, so that the image data representing the views of the scene can be combined without further steps of converting data captured by one or more of the cameras into a different format. The eight cameras 104 provide eight different camera viewpoints of the scene. However, with the use of FVVR, the scene may be rendered from a rendering viewpoint which might not be the same as any of the camera viewpoints. For example, FIG. 1 shows a rendering viewpoint which is different to all of the eight camera viewpoints. If the cameras are synchronized then each view of the scene is captured by all of the cameras simultaneously. In other examples, it is possible to use unsynchronized cameras but it becomes more difficult to combine the different views of the scene because time, as well as space, becomes a variable that is taken into account in combining the views of the scene.

FIG. 4 shows a first view 402 of the scene taken from the viewpoint of the camera $104_1$. The scene includes the person 102 against the plain background. FIG. 4 also shows a second view 404 of the scene taken from the viewpoint of the camera $104_2$. FIG. 4 also shows a novel view 406 of the scene from the rendering viewpoint which has been rendered according to methods described herein. It can be seen that the rendering viewpoint is between the camera viewpoints of the cameras $104_1$ and $104_2$.

Figure 2:
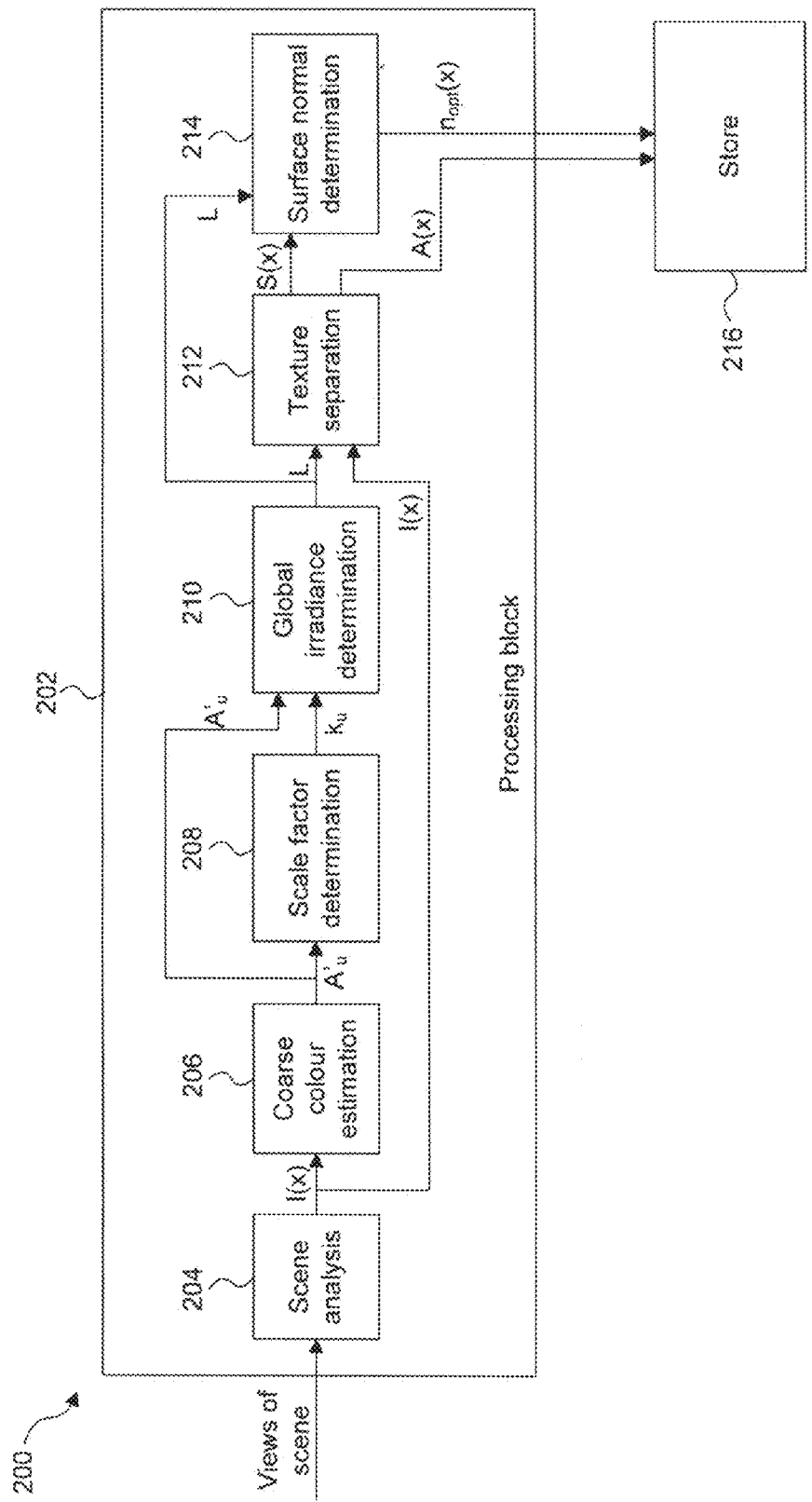
FIG. 2 is a schematic diagram of an image processing system.

FIG. 2 shows an image processing system 200 (e.g. a video processing system in the case that the images are frames of a video sequence) which comprises a processing block 202 and a store 216. The processing block 202 comprises scene analysis logic 204, coarse colour estimation logic 206, scale factor determination logic 208, global irradiance determination logic 210, texture separation logic 212 and surface normal determination logic 214. The logic blocks 204 to 214 may be implemented on the processing block 202 in hardware or software or a combination thereof. For example, if a logic block is implemented in hardware it may be formed as a particular arrangement of transistors and other hardware components which is suited for performing the desired function of the logic block. In contrast, if a logic block is implemented in software it may comprise a set of computer instructions which can be stored in a memory and can be provided to the processing block 202 for execution thereon, wherein the processing block 202 may be a processing unit, such as a Central Processing Unit (CPU) or a Graphics Processing Unit (GPU). The processing block 202 is configured to receive data representing the views of the scene from the cameras 104. The processing block 202 is configured to process the views of the scene (e.g. using the logic blocks 204 to 214) to determine a colour component, A(x), of a relightable texture and a set of surface normals $n_{opt}(x)$ for use in rendering an image from the rendering viewpoint under arbitrary lighting conditions. The store 216 may be implemented as a memory for storing the colour components of relightable textures and the sets of surface normals.

Figure 3A:
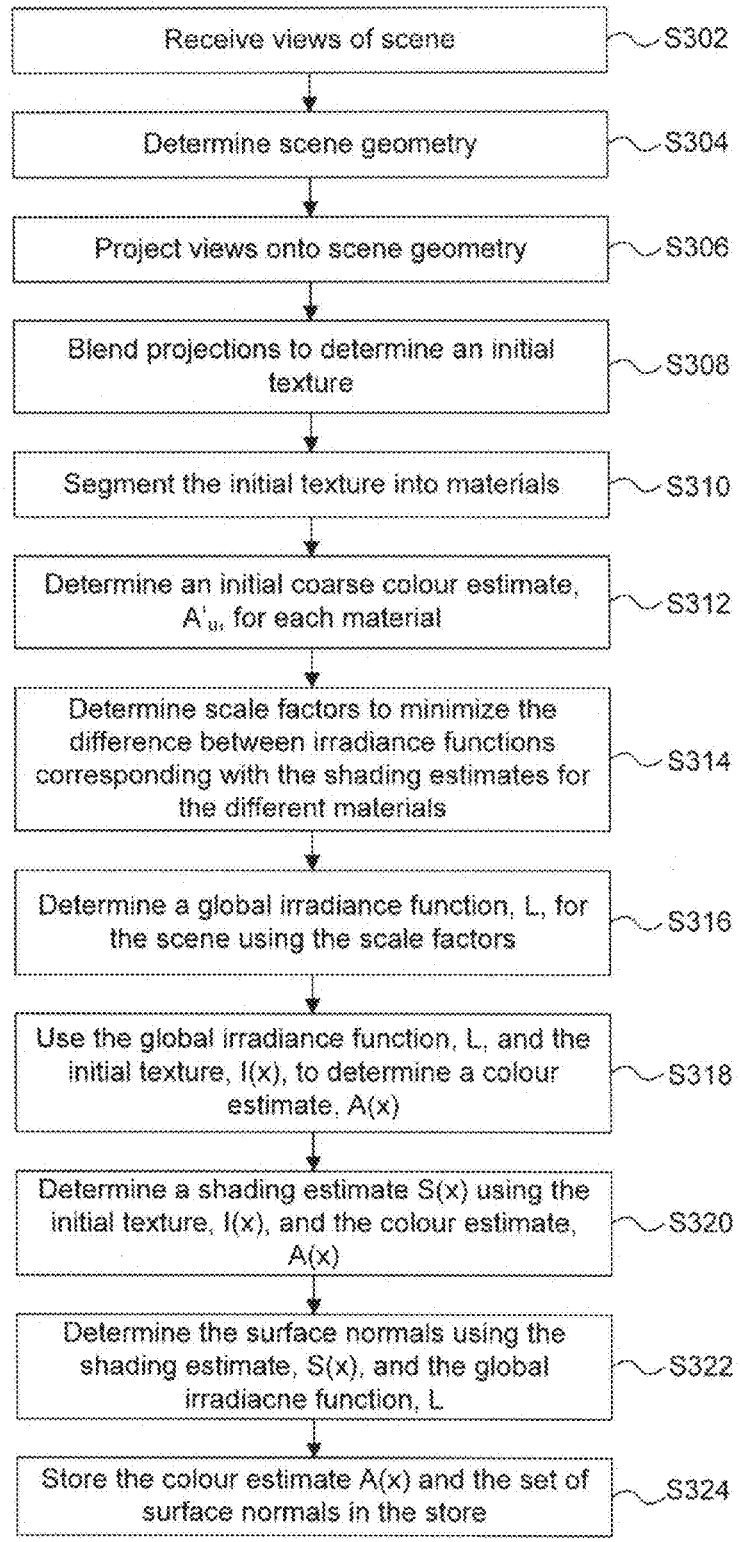
FIG. 3a is a flowchart for a process of determining a colour component of a relightable texture and a set of surface normals for use in rendering an image from a rendering viewpoint under arbitrary lighting conditions.

Operation of the image processing system 200 is described with reference to the flow chart shown in FIG. 3a. In the examples described in detail herein, the method steps shown in FIG. 3a are performed offline, i.e. before the scene is to be rendered from the rendering viewpoint. In other examples, the method steps shown in FIG. 3a may be performed at runtime, i.e. as the scene is being rendered, but this requires a large amount of processing resources for the render which are usually not available on a mobile device. The method steps shown in FIG. 3 may be performed responsive to the views of the scene being captured by the cameras 104. As described in more detail below, a model (or "proxy") of the scene geometry is constructed based on the different views of the scene and a colour component of a relightable texture is formed which can be applied to the model. The colour component of the relightable texture and a set of surface normals for the scene can then be stored, e.g. in the store 216. Subsequently, at render time, the colour component of the relightable texture and the set of surface normals can be retrieved from the memory and the scene can be rendered from the rendering viewpoint. The surface normals are used to relight the texture using the lighting conditions that are appropriate for the rendered scene, which may be different to the lighting conditions of the scene when the images were captured by the cameras 104. The estimated surface normals compensate for high-frequency geometry which is missing from an MVS reconstruction. Since in the examples described in detail herein, much of the processing is front-loaded (i.e. performed before the scene is rendered), the processing that is performed during rendering is reduced. The offline steps (i.e. preprocessing steps) performed before the rendering of the scene to determine the colour component of the relightable texture and the surface normals representing the scene may be implemented in a computer with substantial available resources, e.g. processing power and memory. The preprocessing steps may take a significant time to complete, e.g. such that each frame may take of the order of tens of minutes (e.g. 20 minutes) to process (including the MVS reconstruction stage). The rendering of the scene from the rendering viewpoint may be implemented on the same device or a different device as that which performed the preprocessing steps. For example, the output from the preprocessing steps (i.e. the colour component of the relightable texture and the set of surface normals) may be provided to a rendering device, such as a mobile device for rendering an image from an arbitrary rendering viewpoint under arbitrary lighting conditions. The output from the preprocessing steps may be used to render multiple images for a scene, where each image may be rendered from a different rendering viewpoint and with different lighting conditions. When the image is a frame of a video sequence, and the video is rendered, the video may be output in real-time, with multiple frames (e.g. twenty frames) being processed per second. The processing resources of the rendering device may be limited; this is particularly the case when implementing the renderer on a mobile device for which the processing power and memory capacity may be significantly limited. Since a substantial amount of the processing is performed in the preprocessing steps, the processing performed at the time of rendering is reduced, which can allow a video to be rendered and output in real-time (e.g. at at least approximately 20 frames per second) even on rendering devices such as mobile devices which may have limited resources available.

In step S302 the views of the scene are received at the processing block 202 from the cameras 104. In particular, the views of the scene are received at the scene analysis logic 204. The data representing the views of the scene may be provided from the cameras 104 to the processing block 202 via any suitable link, e.g. a wired or wireless link.

In step S304 the scene analysis logic 204 analyses the views of the scene to estimate scene geometry, e.g. to thereby determine a model of the scene. There are many ways of constructing a 3D geometric proxy (i.e. a "model") of the scene geometry (e.g. Multiple View Stereo (MVS)), and these processes are generally known as "image-based modelling" in the art. In particular, the scene analysis logic 204 may be configured to perform MVS reconstruction and texture projection. As an example, the use of a wide-baseline capture system favours the use of a visual hull to produce a coarse upper-bound to the scene geometry, which can subsequently be refined by triangulating the positions of features extracted from surface detail.

In step S306 the views of the scene from the different camera viewpoints are projected onto the model of the scene geometry by the scene analysis logic 204. Methods for projecting the views onto the model are known in the art. It will be appreciated that each view of the scene will usually include data for some, but not all, of the surfaces of the model of the scene geometry onto which that view can be projected. For example, a view of the front of the person 102 may not include any data for projection onto the back of the person 102 in the model of the scene. However, preferably all of the surfaces of the model of the scene are in view of at least one of the cameras 104 such that the combination of views of the scene from the different cameras 104 can be used to project a view onto the whole of the model of the scene.

The images, the model and the textures described herein may each be represented by an array (e.g. a 2D array) of spatially distinct units, x, which can each have one or more values associated with them. As a matter of terminology, these spatially distinct units may be referred to with different terms. That is, the spatially distinct units of an image (in display-space) which is intended to be viewed are referred to herein as "pixels"; the spatially distinct units of a texture (in texture-space) are referred to herein as "texels"; and the spatially distinct units of the model (in the 3D model-space) are referred to herein as "fragments", wherein each fragment is at a "sample position" on a surface of the scene geometry.

In step S308 the views of the scene which have been projected onto the model are blended by the scene analysis logic 204 to determine a blended texture (which may be referred to as an "initial texture" or a reference texture). For example, for each fragment of the model, each camera is classified according to how well the camera can view that fragment of the model, e.g. based on whether the camera can directly view the fragment of the model, whether the view of the fragment from the camera is obstructed, and/or the angle between the camera viewpoint and the surface normal of the model at the fragment position. The views from one or more of the cameras (e.g. those with the highest classifications for the fragments of the model) can then be blended based on the classifications for the different cameras, e.g. for each fragment position of the model, the projected values from the one or more camera viewpoints may be summed together in a weighted sum wherein the weights of the sum are determined based on the classifications of the cameras. In some examples, for each fragment of the model, the projected value from the camera with the best classification for that fragment is chosen and then those values for the fragments of the model are used to form the blended texture. The blended texture may be a map of per texel values which can be applied to the geometric model for use in rendering the scene from a rendering viewpoint. The blended texture may include three colour components, such as Red, Green and Blue (RGB) components, which may be treated independently. That is, when a model and a blended texture have been determined a view of the scene from a rendering viewpoint can be determined by determining how the model, with the blended texture applied thereto, would appear from the rendering viewpoint. The following steps of the method are performed to improve the plausibility of the rendered view of the scene, in particular when the scene is relit under arbitrary lighting conditions.

In the examples described in detail herein a blended texture is used. A blended texture is just one example of an initial texture which may be used. In general terms, any initial texture which is derived (by blending or otherwise) from the views of the scene from the camera viewpoints may be used in the same way that the blended texture is used in the examples described in detail herein.

Different materials in a scene will interact with light differently. Therefore, a relighting of a scene will affect different materials that are present in the scene differently. In step S310, the scene analysis logic 204 segments the initial texture into a plurality of materials including M materials. The segmentation of the initial (e.g. blended) texture into materials may be performed automatically, manually or a combination thereof. For example, a graph-cuts based technique taking into account similarity in colour or luma could be used to segment the texture into regions of similar appearance. The segmentation of the scene into materials may be carried out in a number of different ways using techniques proper to the field of image segmentation. For example, the segmentation should be valid over the surface of a 2D manifold embedded in 3D space. In other words, preferably, techniques valid for image segmentation should be adapted to take into account the curved geometry of the manifold when applied to textures. The UV chart, or UV map, defines the mapping from a texture onto the mesh surface. Typically, a UV chart will split the surface of a mesh into sections which are "flattened out" onto the UV plane. The segmentation method preferably takes into account these boundaries on the UV chart, which prevent a straightforward image segmentation method from being directly applied. Furthermore, the process of "flattening out" curved regions of the mesh onto a UV plane may introduce distortions in both surface area and angle. It has been found that splitting the surface of the mesh into individual triangles on the UV chart to avoid distortion, and identifying links between the edges of triangles in the texture, allows image segmentation techniques to be applied directly to texture segmentation.

The initial texture, I(x), and the model of the scene geometry are passed from the scene analysis logic 204 to the coarse colour estimation logic 206. The model of the scene geometry includes a set of coarse surface normals, $n_c(x)$, which estimate the surface normals of the surfaces in the scene. However, as described above, the coarse surface normals estimated in this way might not be completely accurate, and are typically not sufficiently accurate for use in rendering an image from a rendering viewpoint under arbitrary lighting conditions. As described above, x may refer to a texel position in texture space or to a sample position on a surface of the scene geometry in the 3D model space.

In step S312, for each material u in the set of M materials, the coarse colour estimation logic 206 determines an initial coarse colour estimate, $A'_u$. Each of the initial coarse colour estimates, $A'_u$, may comprise a single value for a respective material. For example, $A'_u$ may be determined by finding the average of the values in the initial texture for the material, i.e. by finding the average colour of all the texels comprising that material. That is:

$$A'_u = \frac{1}{|u|} \Sigma_{x \in u} I(x) \; \forall \, u \in M. \tag{1}$$

The initial coarse colour estimates $A'_u$ are provided to the scale factor determination logic 208. The average colour of the texels for a material depends upon the lighting of the scene as well as the colour of the materials in the scene. In the case of monochrome lighting, the initial coarse colour estimate $A'_u$ for material u is a scaled version of a final coarse albedo, $A_u$, for that material, such that $$A_u = \frac{A'_u}{k'_u},$$

where $k_u$ is a scale factor for the material u. It is noted that having a scale factor of 1 is equivalent to not having a scale factor.

In step S314 the scale factor determination logic 208 determines the scale factors $k_u$ for the materials. The scale factors are determined based on differences between irradiance estimates, $L_u$, determined for the materials based on shading estimates, $S_u$, which correspond with scaled versions of the initial coarse colour estimates, $A'_u$, of the materials. The shading estimate $S_u(x)$ for a material can be estimated as:

$$S_u(x) = \frac{I_u(x)}{A_u(x)} = k_u \frac{I_u(x)}{A'_u(x)} = k_u S'_u(x). \tag{2}$$

The shading estimates provide an indication of the scene lighting, i.e. the global irradiance present when the images were captured. If two material segments both face in approximately the same direction (i.e. their surface normals point approximately in the same direction) then the shading estimates for the two materials should be approximately the same since they will both be lit by the same irradiance. This insight can be used to determine the values of the scale factors which provide a good match of the irradiance for different materials.

That is, the low-frequency shading can be considered to represent samples of the irradiance function such that, for each material u, the shading estimate $S_u(x)$ can be projected along the coarse surface normal $n_c(x)$ provided by the MVS scene reconstruction to give an estimate of the irradiance function, $L_u(n_c(x))$. The irradiance function $L(n_c(x))$ can be estimated from the shading estimate for each material as a combination of an initial irradiance function $L'_u(n_c(x))$ (which corresponds with the initial shading estimate $S'_u(x)$) and the scale factor $k_u$. That is, $L(n_c(x)) \approx L'_u(n_c(x))k_u = S_u(x)$.

The scale factors $k_u$ can be determined by finding the scale factors which minimise the differences between irradiance estimates predicted for different materials in overlapping regions of the irradiance estimates. The measure of the differences between the irradiance estimates, $L_u$, for the different materials is dependent upon the scale factors, $k_u$, because for a particular scale factor the irradiance estimate for a material matches the initial shading estimate which corresponds with a version of the initial coarse colour estimate scaled with the particular scale factor. That is, the irradiance estimate $L_u(n_c(x))=k_u S'(x)$. For example, the sum of squared error in the overlap regions between the local irradiance estimates $L'_u$ can be minimised by appropriate choices of $k_u$. For two materials, i and j, a binary support function, $Q_{i,j}(\theta,\phi)$, describes the overlap in the irradiance estimates $L_i(n_c(x))$ and $L_j(n_c(x))$. The binary support function, $Q_{i,j}(\theta,\phi)$, is a function of direction described by the spherical co-ordinates $\theta$ and $\phi$, and has a value of zero for directions in which the irradiance estimates of materials i and j do not overlap and has a value of one for directions in which the irradiance estimates of materials i and j do overlap.

Figure 5C:
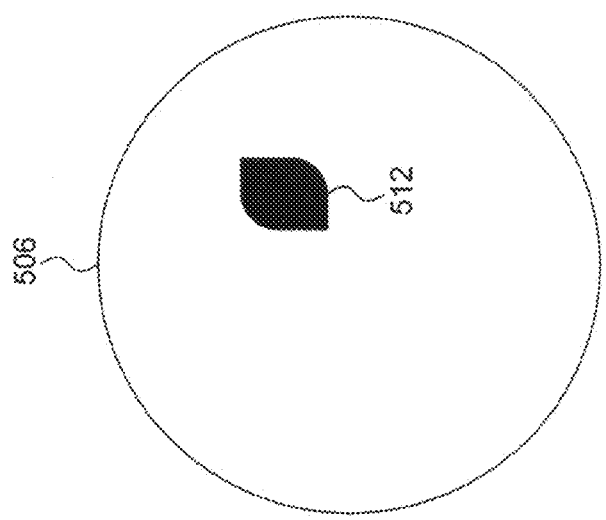
FIG. 5c shows the overlap of the irradiance estimates for the two materials.
Figure 5B:
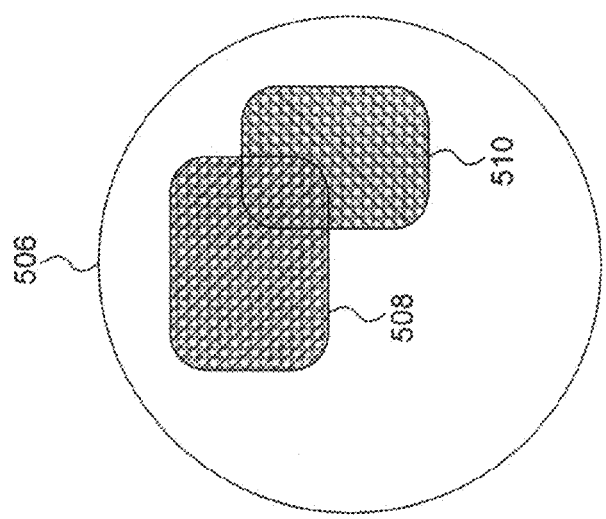
Figure 5A:
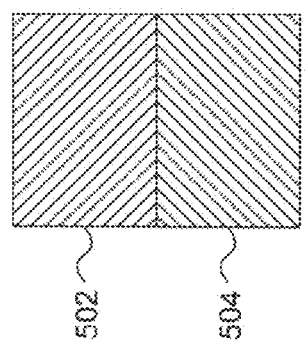
FIG. 5a shows two materials of the initial texture.

For example, FIG. 5a shows material i (denoted 502) and material j (denoted 504) which face approximately in the same direction. FIG. 5b shows irradiance estimates as projections of the shading estimates for the materials 502 and 504. In particular, the circle 506 is a 2D representation of the whole sphere of possible directions $(\theta,\phi)$, the region 508 represents the coverage of the irradiance estimate $L_i(\theta,\phi)$ for material i, and the region 510 represents the coverage of the irradiance estimate $L_j(\theta,\phi)$ for material j. It can be seen that the two regions (508 and 510) partially overlap with each other. FIG. 5c represents the value of the binary support function $Q_{i,j}(\theta,\phi)$ over the sphere of possible directions 506. $Q_{i,j}(\theta,\phi)$ has a value of one in the overlapping region 512, and a value of zero for all other directions. The scale factors $k_i$ and $k_j$ should be chosen so that the two irradiance estimates $L_i$ and $L_j$ are similar to each other in the overlapping region 512. A similar process can be performed for each pair of materials in the scene.

The squared error between irradiance estimates between pairs of materials in overlapping regions can be considered by summing the squared errors for each pair of materials to determine a sum of squared errors E, according to the equation:

$$E = \Sigma_i \Sigma_{j>i} [\int_\Omega (k_i L'_i(\theta,\phi) - k_j L'_j(\theta,\phi)) Q_{i,j}(\theta,\phi) d\Omega]^2 \quad (3)$$

where $\Omega$ is the solid angle covering all possible directions $(\theta,\phi)$.

Equation (3) can be written as:

$$E = \Sigma_i \Sigma_{j>i} [k_i b_{ij} - k_j b_{ji}]^2 \quad (4)$$

where $$b_{ij} = \int_\Omega L'_i(\theta,\phi) Q_{i,j}(\theta,\phi) d\Omega. \quad (5)$$

The scale factor determination logic 208 can then find values of the scale factors (k) for the materials with a view to minimising the error given by equations 3 and 4. There is more than one way in which the error can be minimised to find the values of the scale factors. As one example, a greedy algorithm with a least-squares update step for each $k_u$ could be used to minimise E. It is the ratio of the scale factors which is relevant to this method, therefore a first of the scale factors (e.g. $k_1$) is set to a predetermined value (e.g. $k_1$ is set to 1) and the measure of the differences between the irradiance estimates, E, is used to determine the other scale factors ($k_{u>1}$) relative to the first scale factor. In order to do this, all of the scale factors can be initialized to be equal to one, and then the scale factors may be determined one at a time. For example, $k_1$ is set to be equal to one, then a value for $k_2$ is determined which minimizes the error, E, whilst keeping all the other scale factors constant. Then a value for $k_3$ is determined which minimizes the error, E, whilst keeping all the other scale factors constant, and so on.

If $k_c$ is the scale factor currently being optimised, then it can be found according to:

$$k_c \leftarrow \text{argmin}_{k_c} \|k_c b_c - d\|^2 = \frac{b_c^T d}{b_c^T b_c} \quad (6)$$

where $b_c$ is a vector comprising M components according to equation 5 with i=c and j taking values from 1 to M for the respective components, and d is a vector comprising M components, wherein the $j^{th}$ component has a value $d_j = k_j b_{ji}$ with i=c and j taking values from 1 to M for the respective components.

Rather than finding each scale factor in turn as described above, as an alternative a matrix method of finding all of the values of the scale factors $k_u$ at the same time could be used. For example, for each scale factor $k_{c1}$ an equation can be set up to describe how the error E, e.g. as described in equation 3 or 4, could be optimized by finding the value of $k_c$ for which $$\frac{\partial E}{\partial k_c} = 0.$$

Starting from equation 4, a value for $k_c$ can be given by solving the equation:

$$\frac{\partial E}{\partial k_c} = \sum_{i \neq c} (k_c b_{ci} - k_i b_{ic}) b_{ci} = 0 \quad (7)$$

such that:

$$(\Sigma_{i \neq c} b_{ci}^2) k_c - \Sigma_{i \neq c} b_{ci} b_{ic} k_i = 0. \quad (8)$$

All of the scale factors (i.e. all of the values of c from 1 to M) can be considered using a matrix to simultaneously represent equation 8 for each value of c, such that:

$$\begin{bmatrix} \sum_{i \neq 1} b_{1i}^2 & -b_{12}b_{21} & \cdots & -b_{1M}b_{M1} \\ -b_{12}b_{21} & \sum_{i \neq 2} b_{2i}^2 & \cdots & -b_{2M}b_{M2} \\ \vdots & \vdots & \ddots & \vdots \\ -b_{1M}b_{M1} & -b_{2M}b_{M2} & \cdots & \sum_{i \neq M} b_{Mi}^2 \end{bmatrix} \begin{bmatrix} k_1 \\ k_2 \\ \vdots \\ k_M \end{bmatrix} = 0 \quad (9)$$

The matrix shown in equation 9 is of rank M−1, so the vector k spans the null-space of the matrix. The null space of the matrix can be found, e.g. using the known method of Singular Value Decomposition (SVD), to thereby determine the scale factors $k_u$.

Figure 3B:
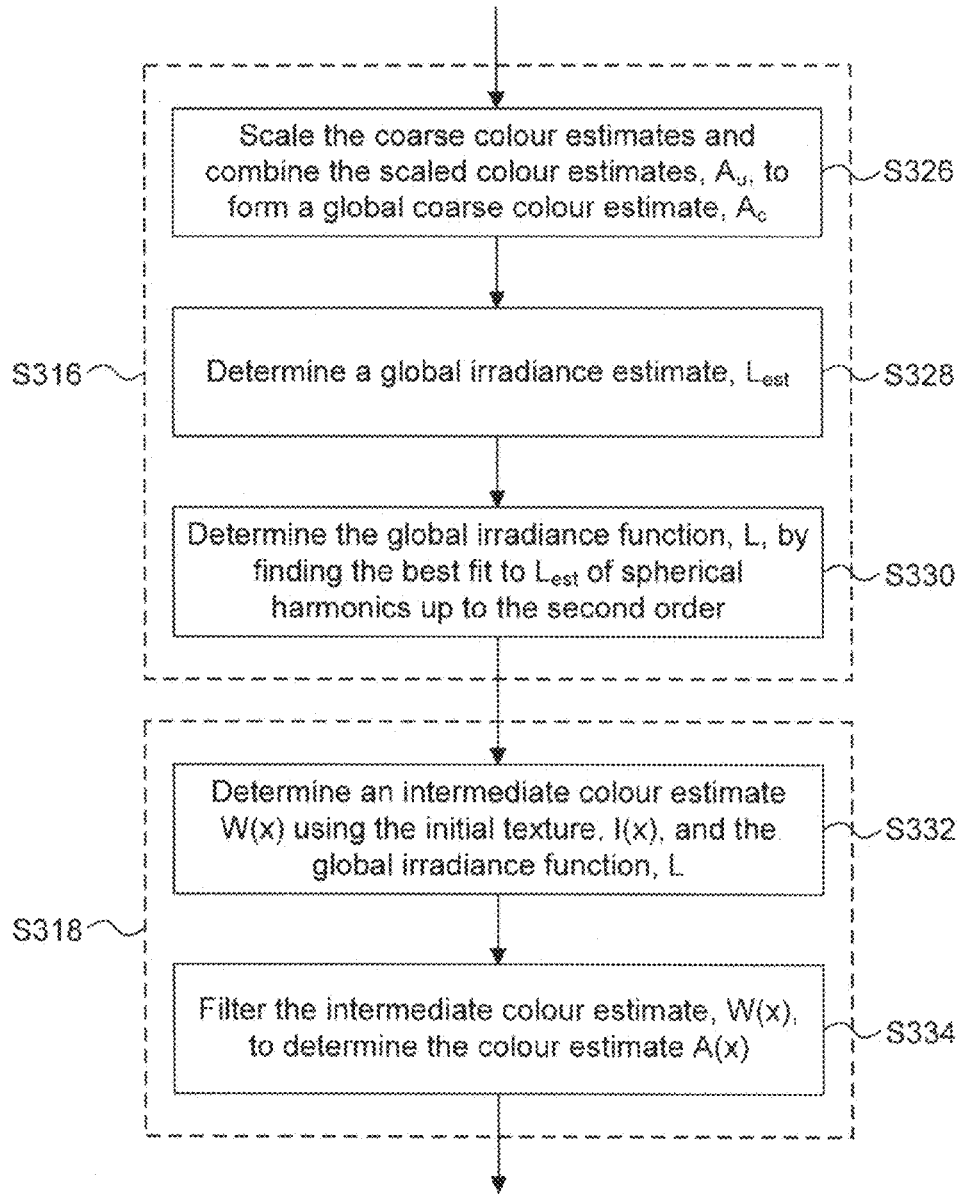

The scale factors $k_u$ are provided to the global irradiance determination logic 210 which also receives the initial coarse colour estimates $A'_u$ from the coarse colour estimation logic 206. In step S316 the global irradiance determination logic 210 determines a global irradiance function, L, for the scene using the determined scaled factors $k_u$. FIG. 3b shows an example of some of the steps (steps S326, S328 and S330) which may be involved in step S316 to determine the global irradiance function, L.

In particular, in step S326 the initial coarse colour estimates $A'_u$ are scaled using the respective scale factors $k_u$ to determine the scaled coarse colour estimates, $A_u$. As described above $$A_u = \frac{A'_u}{k_u}.$$

Step S326 also includes combining the scaled coarse colour estimates, $A_u$, to for a global coarse colour estimate $A_c$ which represents the colour of the M materials in the scene. The global coarse colour estimate $A_c$ can be used to determine the global irradiance function, L. In the main example described herein, the scaled coarse colour estimates, $A_u$, are used to determine the global irradiance function, L. However, in other examples, the scale factors could be used to determine the global irradiance function, L, in a manner which does not include determining the scaled coarse colour estimates, $A_u$.

In step S328 the global irradiance determination logic 210 determines a global irradiance estimate, $L_{est}(n_c(x))$ by dividing the initial texture $I(x)$ by the global coarse colour estimate $A_c(x)$. That is:

$$L_{est}(n_c(x)) = \frac{I(x)}{A_c(x)}. \tag{10}$$

The global irradiance estimate $L_{est}$ may include a significant amount of noise. However, irradiance functions in Lambertian scenes can be represented using spherical harmonics up to the second order to find a good fit to the noisy data. Therefore, in step S330 the global irradiance determination logic 210 determines the global irradiance function $L(n_c(x))$ by finding the best fit to the global irradiance estimate, $L_{est}(n_c(x))$, of spherical harmonics up to the second order. The coefficients of the spherical harmonic basis functions can be found by projection of the global irradiance estimate $L_{est}$ onto the respective basis functions. As is known in the art, the separation of a function into spherical harmonics over spheres is similar to the separation of a function into Fourier components over intervals. The global irradiance function, L, will tend to be a smoother function than the global irradiance estimate $L_{est}$. The global irradiance function, L, provides a good indication of the low-frequency components of the scene lighting.

The global irradiance function, $L(n_c(x))$, and the initial texture $I(x)$ are provided to the texture separation logic 212. In step S318 the texture separation logic 212 uses the global irradiance function, $L(n_c(x))$, and the initial texture $I(x)$ to determine a further colour estimate, $A(x)$. The colour estimate $A(x)$ may be referred to as a "fine colour estimate" because it has per-texel values, which is different to the coarse colour estimates ($A_u$) described above which have per-material values. The values of the initial texture, $I(x)$, can be separated into a colour estimate $A(x)$ and a shading estimate $S(x)$, such that $I(x)=A(x)S(x)$. The shading estimate $S(x)$ also has per-texel values.

FIG. 3b shows an example of some of the steps (steps S332 and S334) which may be involved in step S318 to determine the colour estimate $A(x)$. In particular, in step S332 the texture separation logic determines an intermediate colour estimate $W(x)$ by dividing the values of the initial texture $I(x)$ by the global irradiance function $L(n_c(x))$. That is, $$W(x) = \frac{I(x)}{L(n_c(x))}.$$

The intermediate colour estimate $W(x)$ gives a good starting point for determining the per-texel values of the colour estimate $A(x)$.

In step S334 the texture separation logic 212 filters the intermediate colour estimate $W(x)$ with a modified bilateral filter to determine the colour estimate $A(x)$. The use of the bilateral filter removes local shading contributions from the intermediate colour estimate $W(x)$. In the examples described herein the bilateral filter is applied in texture space. That is, the bilateral filter is adapted to work in the tangent space of the mesh of the scene geometry by filtering directly on the texture in texture space. To prevent distortion from mapping the scene geometry into texture space, the texture to be filtered is split into individual triangles and the filter is applied to a triangle which includes the centre of the filter kernel. If the filter kernel extends off the edge of a triangle then the sample point for the filter is offset to the triangle containing the relevant texel(s).

The bilateral filter may be applied iteratively (e.g. ten times) such that the result of the bilateral filter is fed back into the bilateral filter to be filtered again. However, it has been found that a single application of the bilateral filter is sufficient for determining good results for the colour estimate $A(x)$.

The bilateral filtering flattens out regions which are similar in terms of albedo and luminance. That is, a filtered value, $W'(x)$, of the intermediate colour estimate $W(x)$ at texel position x is equivalent to a weighted sum of the neighbouring texels within a filter kernel centred on the texel position x, whereby the weights of the sum are dependent upon the similarity between the respective neighbouring texel and the texel at position x. A measure of similarity between the neighbouring texel and the texel at position x is used, wherein the similarity measure is based on both: (i) the similarity in luminance of the texels, and (ii) the similarity in chrominance of the texels. Conventional bilateral filters do not consider the similarity in chrominance of texels, but it is useful to include this in the similarity measure in this case because it is the colour estimate which is being filtered, so the chromatic similarity between texels is an important aspect in measuring the similarity of texels for the purposes of filtering a colour estimate.

As an example, one application of the bilateral filter can be described by the equation:

$$A(x) = \frac{1}{u} \int_\mu W(\mu) e^{-\frac{\|x-\mu\|_2^2}{\sigma_w^2}} e^{-\frac{\left(\cos^{-1}\left(\hat{W}(x)^T \hat{W}(\mu)\right)\right)^2}{\sigma_{i1}^2}} e^{-\frac{(luma(W(x))-luma(W(\mu)))^2}{\sigma_{i2}^2}} d\mu \tag{11}$$

where $A(x)$ is the colour estimate which has values at texel positions x, $\mu$ are the texel positions within the kernel of the bilateral filter, W is the intermediate colour estimate, $\hat{W}(x)$ represents the chrominance of the texel of the intermediate colour estimate at position x and luma($W(x)$) represents the luminance of the intermediate colour estimate at position x, u is a normalization term, and wherein $\sigma_w$, $\sigma_{i1}$ and $\sigma_{i2}$ are parameters of the bilateral filter which can be adapted. The luminance of a texel at position x can be found from the red (R), green (G) and blue (B) values for the pixel, e.g. such that $\text{luma}(x)=0.299R(x)+0.587G(x)+0.114B(x)$.

The $$e^{-\frac{\|x-\mu\|_2^2}{\sigma_w^2}}$$

term is a bilateral filter term which weights the filter towards texels which are spatially close to the texel position x. The $$e^{-\frac{\left(\cos^{-1}\left(\hat{W}(x)^T \hat{W}(\mu)\right)\right)^2}{\sigma_{i1}^2}}$$

term provides a measure of the similarity in chrominance of the texels at position x and µ, such that if the chrominance of the texels are similar then a high weighting is applied by the bilateral filter, and if the chrominance of the texels are not similar then a low weighting is applied by the bilateral filter. The $$e^{-\frac{(\text{luma}(W(x))-\text{luma}(W(\mu)))^2}{\sigma_{i2}^2}}$$

term provides a measure of the similarity in luminance of the texels at position x and µ, such that if the luminance of the texels are similar then a high weighting is applied by the bilateral filter, and if the luminance of the texels are not similar then a low weighting is applied by the bilateral filter.

When the bilateral filter is used iteratively, the result of one iteration is fed back into equation 11 in place of W, to thereby apply the bilateral filter again.

The filter kernel of the bilateral filter may be any suitable shape and/or size. As an example, a rectangular filter kernel may be used which is centred on the texel position x. For example, the filter kernel may cover a 15×15 block of texels centred on the texel position x.

The bilateral filter is complementary to the global shading estimate, in that it performs a high-quality local decomposition into albedo and shading, but does not produce such a good global decomposition. On the other hand, the lighting reconstruction (which forms the global shading estimate) performs well globally, but does not produce such a good local decomposition.

In step S320 the texture separation logic 212 determines the per-texel values of the shading estimate S(x) by dividing the initial texture values I(x) by the colour estimate values A(x). That is, $$S(x) = \frac{I(x)}{A(x)}.$$

The colour estimate A(x) and the shading estimate S(x) are mutually orthogonal in the sense that they are independent appearance parameters.

Figure 6:
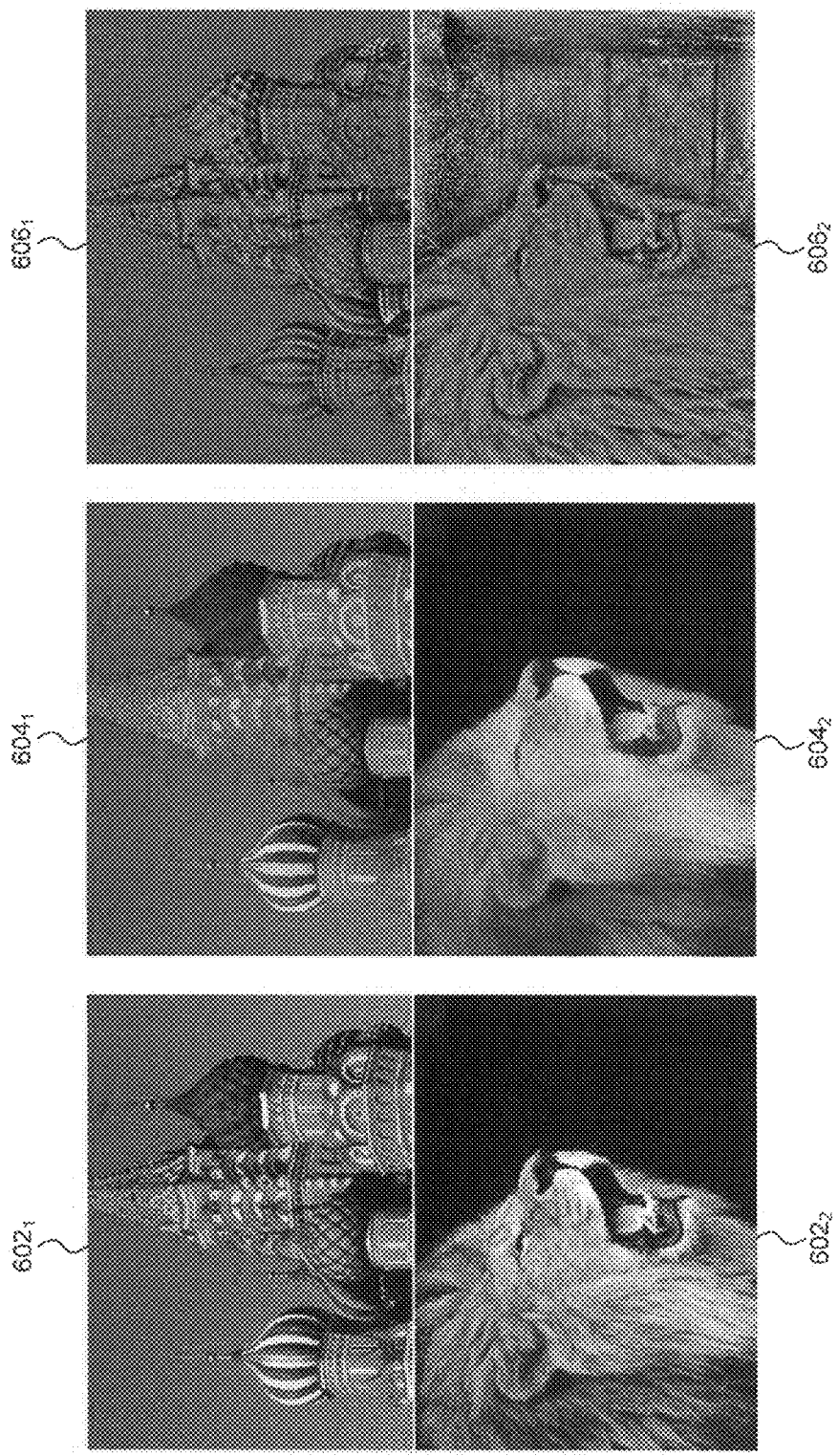
FIG. 6 shows two examples of the separation of an original image into a colour estimate and a shading estimate.

FIG. 6 shows two examples of separating an original image into a colour estimate and a shading estimate. In the first example, the original image $602_1$ is separated into a colour estimate $604_1$ and a shading estimate $606_1$. In the second example, the original image $602_2$ is separated into a colour estimate $604_2$ and a shading estimate $606_2$. In both examples, it can be appreciated from FIG. 6 that the original image of the scene is separated into a colour estimate ($604_1$ or $604_2$) whilst the lighting effects caused by the particular scene lighting of the captured images are separated out into a shading estimate ($606_1$ or $606_2$). By separating the colour from the shading, the scene can be relit by applying a different lighting effect to the colour estimates. In order to correctly apply a different lighting effect to the colour estimate, the surface normals of the scene geometry are determined, as described below.

The colour estimate A(x) and the shading estimate S(x) are outputted from the texture separation logic 212. The colour estimate A(x) represents the colour component of the relightable texture, and can be provided from the texture separation logic 212 to the store 216. The shading estimate S(x) is provided to the surface normal determination logic 214.

In step S322 the surface normal determination logic 214 determines the set of surface normals for the scene using the global irradiance function L and the shading estimate S(x). The global irradiance function L is a function of the surface normal n. The surface normals are determined by finding the normals which minimize an error metric comprising a measure of the difference between the shading estimate S(x) and the global irradiance function L(n). For each point on the surface of the mesh of the scene geometry, x, the error metric E(n(x)) is given by equation 12:

$$E(n(x))=\|S(x)-L(n)\|_1+\Lambda(n,n_c). \qquad (12)$$

The set of fitted surface normals $n_{opt}(x)$ are given by:

$$n_{opt}(x)=\text{argmin}_n E(n(x)). \qquad (13)$$

The set of surface normals, $n_{opt}(x)$, comprise a surface normal for each sample position x on a surface of the scene geometry.

The L1 norm is used in equation 12 to measure the difference between the shading estimation S(x) and the global irradiance function L(n) because it is robust in the presence of noise. The error metric E(n(x)) comprises the regularization term, $\Lambda(n,n_c)$, which is a function of a difference between a proposed surface normal and a coarse surface normal predicted from the estimated scene geometry. The MVS reconstruction of the scene gives a good indication of likely normal fits (the coarse surface normals $n_c$). Large deviations of the fitted normals n from the coarse normals $n_c$ are unlikely, and are therefore penalized using the regularization term $\Lambda$. For example, the regularization term may be a function of the angle between the two vectors $n_c$ and n, and may be defined as:

$$\Lambda(n, n_c) = \begin{cases} \lambda(\cos^{-1}(n^T n_c))^2, & n^T n_c > 0 \\ \infty, & \text{otherwise} \end{cases} \qquad (14)$$

where $\lambda$ is a parameter which may be determined experimentally. For example, a value of 0.025 may be used for $\lambda$.

Since there is no inter-sample dependency in equation 12, the surface normals can be computed in parallel for the different sample positions, x. For example, the surface normals may be fitted in parallel on a graphics processing unit (GPU).

The set of surface normals $n_{opt}(x)$ are outputted from the surface normal determination logic 214. In step S324, the colour estimate A(x) and the set of surface normals $n_{opt}(x)$ are stored in the store 216 for subsequent use in rendering the image from a rendering viewpoint under arbitrary lighting conditions.

As described above, the method described herein with reference to FIG. 3 for determining the colour component of the relightable texture A(x) and the set of surface normals $n_{opt}(x)$ may be implemented before rendering of the image (e.g. which may be a frame of a video sequence) commences. In this way, the colour component of the relightable texture and the surface normals for the scenes of the image can be determined offline, i.e. before the image is rendered. The determining of the colour component of the relightable texture and the surface normals may be computed on a high-performance device (e.g. high processing power and memory capacity). The stored colour component of the relightable texture and the surface normals may be provided to another device (e.g. a mobile phone) for rendering the image from a rendering viewpoint. The device which renders the image may be low performance (e.g. processing power and memory capacity) available. However, due to the fact that the colour component of the relightable texture and the surface normals are determined offline, the amount of processing used in run-time (i.e. during rendering of the image) is reduced. When rendering the scene of an image, the relightable texture is relit according to a lighting arrangement that is set for the render and the image is rendered from a rendering viewpoint which is also set for the render. These processes can be performed quickly using 3D graphics rendering techniques and therefore when the image is a frame of a video sequence, the video sequences can be played out at an acceptable frame rate (e.g. twenty frames per second or more) even on devices which may not have strong processing performance. Current mobile phones, for example, do not have sufficient processing resources to determine the relightable textures, but many current mobile phones do include hardware for accelerated lighting and rendering of textured 3D models.

The ability to relight scenes in images, such as frames of a video sequence, using relightable FVVR allows scenes captured from the "real world" to be integrated seamlessly into computer-generated scenes, by matching the lighting conditions of the rest of the scene.

The functions of the methods described above in relation to FIG. 3 may be performed by other arrangements of logic than those described and shown herein, and some of the functionality described above as being implemented in one logic block may be implemented in a different logic block in other examples. The logic blocks of the processing block 202 may be implemented in hardware or software or a combination thereof. Where the logic blocks are implemented in software, they may be implemented by executing a computer program on a processor (e.g. a CPU or a GPU), wherein the computer program comprises instructions for carrying out the method steps described herein.

Figure 7:
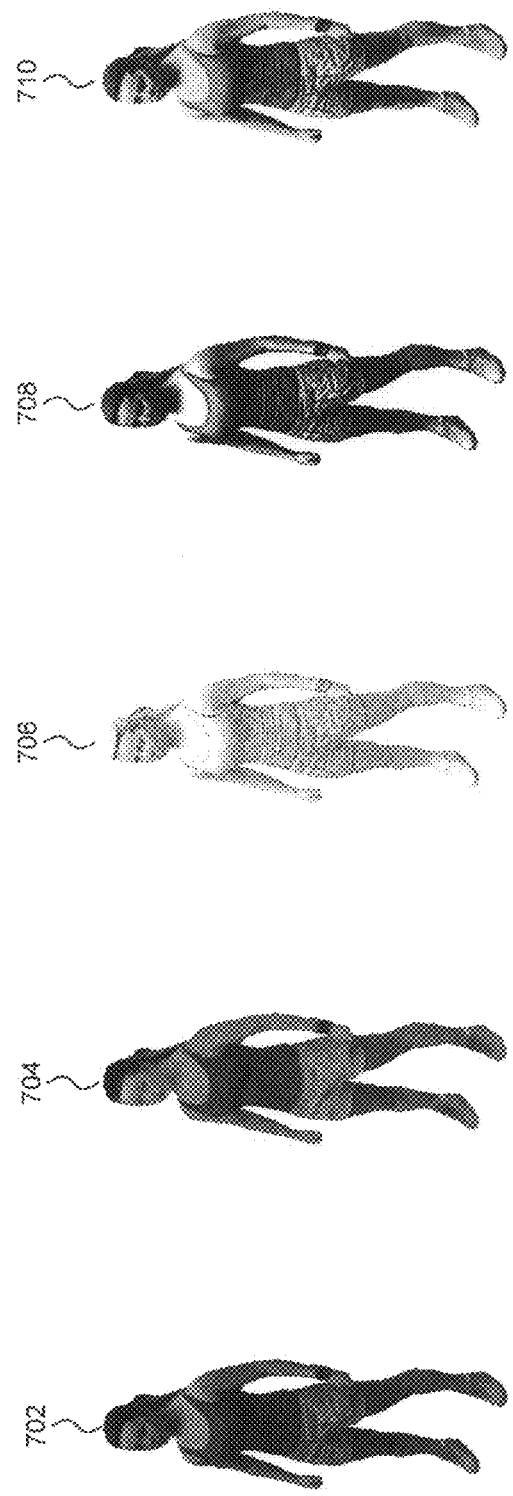
FIG. 7 shows an example of the result of separating an initial texture into a colour estimate and a shading estimate, and two relit textures under different lighting arrangements.

FIG. 7 shows an example of an original texture I(x) 702, a colour estimate A(x) 704 and a shading estimate S(x) 706. FIG. 7 also shows the result 708 of relighting the colour estimate A(x) under a first lighting arrangement in accordance with the methods described herein, and the result 710 of relighting the colour estimate A(x) under a second lighting arrangement in accordance with the methods described herein. The difference in lighting between the original texture 702, and the two relit textures 708 and 710 can be seen in FIG. 7.

The examples described in detail above relate to free-viewpoint rendering. However, the generation of a colour component of a relightable texture and a set of surface normals as described above can be used in other examples where the initial texture may be determined differently to how it is determined in free-viewpoint rendering. For example, the rendering viewpoint does not need to be different to the one or more camera viewpoints. The lighting that is to be applied to the texture for rendering may be different to the lighting of the scene when the initial texture is determined; this is the case irrespective of whether the rendering viewpoint is the same as any of the camera viewpoints.

The methods described above effectively separate the initial texture into a colour estimate and a shading estimate. This is achieved by determining a low-frequency lighting estimate (i.e. the global irradiance function, L) for the captured images based on matching the irradiance functions for different materials in the image and, for example, finding the best fit up to the $2^{nd}$ order spherical harmonics. No prior knowledge of the scene lighting is assumed. The global irradiance function can then be used to separate the initial texture into the colour estimate and the shading estimate. The shading estimate is used to determine surface normals for the scene. The colour estimate and the surface normals allow the scene to be relit and rendered under arbitrary lighting conditions accurately. This may increase the plausibility of the final rendered scene.

Figure 8:
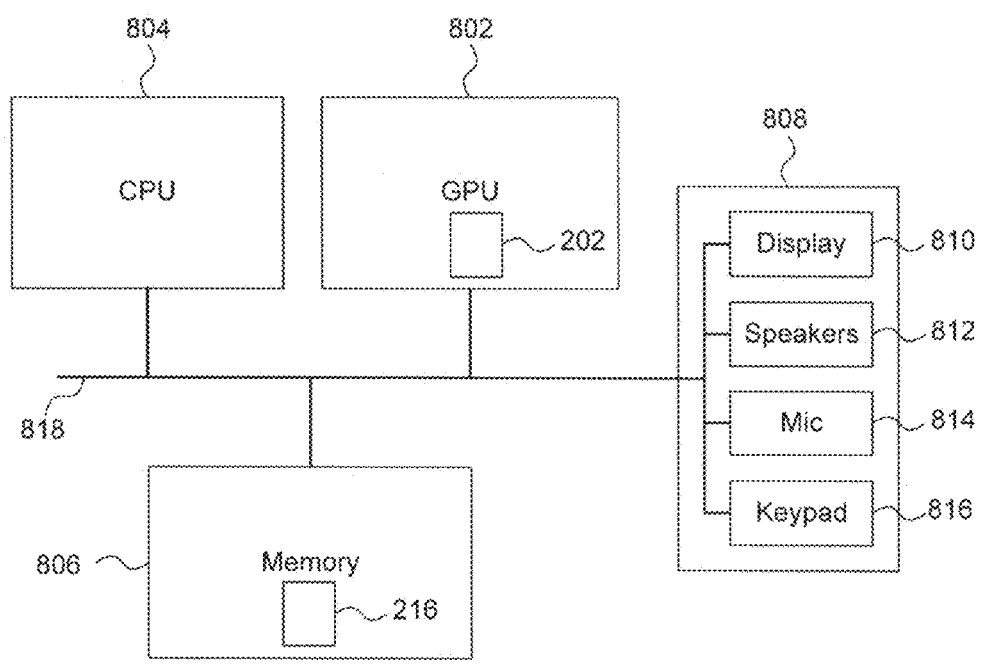
FIG. 8 shows a computer system in which an image processing system may be implemented.

The image processing system 200 may be implemented in a computer system such as that shown in FIG. 8, which comprises a GPU 802, a CPU 804, a memory 806 and other devices 808, such as a display 810, speakers 812, a microphone 814 and a keypad 816. The components of the computer system can communicate with each other via a communications bus 818. The processing block 202 may be implemented (e.g. in hardware) as part of the GPU 802 as shown in FIG. 8. Alternatively, the processing block may be implemented on the CPU 804. If the processing block is implemented in software then it may be stored as computer program code in the memory 806 and may be executed on a processing unit in the computer system (e.g. on the GPU 802 or the CPU 804). The store 216 may be part of the memory 806.

Generally, any of the functions, methods, techniques or components described above can be implemented in modules using software, firmware, hardware (e.g., fixed logic circuitry), or any combination of these implementations. The terms "module," "functionality," "component", "block" and "logic" are used herein to generally represent software, firmware, hardware, or any combination thereof.

In the case of a software implementation, the module, functionality, block, component or logic represents program code that performs specified tasks when executed on a processor (e.g. one or more CPUs). In one example, the methods described may be performed by a computer configured with software of a computer program product in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component, block or logic (e.g. the logic blocks 204 to 214 in the processing block 202) may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, block, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing block configured to perform any of the methods described herein, or for generating a processing block comprising any apparatus described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method of determining a colour component of a relightable texture and a set of surface normals for use in rendering an image from a rendering viewpoint under arbitrary lighting conditions, wherein at least one view of a scene from a respective at least one camera viewpoint represents the image, the method comprising:
analysing the at least one view of the scene to estimate scene geometry and to segment an initial texture into a plurality of materials, the initial texture being separable into a colour estimate and a corresponding shading estimate;
determining an initial coarse colour estimate for each of the materials;
determining one or more scale factors, for scaling a respective one or more of the initial coarse colour estimates, the scale factors being determined based on differences between irradiance estimates determined for the materials based on shading estimates which correspond with scaled versions of the initial coarse colour estimates of the materials;
determining a global irradiance function for the scene using the determined scale factors;
using the global irradiance function and the initial texture to determine a further colour estimate and a corresponding further shading estimate, wherein the further colour estimate represents the colour component of the relightable texture; and
determining the set of surface normals using the global irradiance function and the further shading estimate.

2. The method of claim 1 wherein each of the initial coarse colour estimates comprises a single value for the respective material.

3. The method of claim 1 wherein, for each of the materials, the initial coarse colour estimate is determined by finding the average of the values in the initial texture for the material.

4. The method of claim 1 wherein the further colour estimate and the further shading estimate have per-texel values.

5. The method of claim 1 wherein the set of surface normals comprises a surface normal for each of a plurality of sample positions on a surface of the scene geometry.

6. The method of any claim 1 wherein said determining a global irradiance function for the scene using the determined scale factors comprises:
scaling the one or more of the initial coarse colour estimates using the determined scale factors; and
using the scaled coarse colour estimates to determine the global irradiance function.

7. The method of claim 6 wherein said using the scaled coarse colour estimates to determine the global irradiance function comprises:
combining the scaled coarse colour estimates to form a global coarse colour estimate; and
using the global coarse colour estimate to determine the global irradiance function.

8. The method of claim 7 wherein said using the global coarse colour estimate to determine the global irradiance function comprises:
dividing the initial texture by the global coarse colour estimate to determine a global irradiance estimate; and determining the global irradiance function by finding the best fit to the global irradiance estimate of spherical harmonics up to the second order.

9. The method of claim 1 wherein said determining one or more scale factors comprises:
   determining a measure of the differences between irradiance estimates for different materials in overlapping regions of the irradiance estimates, said measure of the differences being dependent upon the scale factors, wherein for a particular scale factor the irradiance estimate for a material matches the shading estimate which corresponds with a version of the initial coarse colour estimate scaled with the particular scale factor; and
   determining the scale factors so as to minimise the measure of the differences.

10. The method of claim 1 wherein said using the global irradiance function and the initial texture to determine a further colour estimate comprises:
    dividing the initial texture by the global irradiance function to determine an intermediate colour estimate; and
    filtering the intermediate colour estimate with a bilateral filter to determine said further colour estimate.

11. The method of claim 10 wherein the bilateral filter uses a measure of similarity between texels based on both: (i) the similarity in luminance of the texels, and (ii) the similarity in chrominance of the texels.

12. The method of claim 11 wherein the further colour estimate, A(x), has values at texel positions, x, and wherein the bilateral filter is described by the equation:

$$A(x) = \frac{1}{u} \int_{\mu} W(\mu) e^{-\frac{\|x-\mu\|_2^2}{\sigma_w^2}} e^{-\frac{\left(\cos^{-1}\left(\hat{W}(x)^T \hat{W}(\mu)\right)\right)^2}{\sigma_{l1}^2}} e^{-\frac{(luma(W(x))-luma(W(\mu)))^2}{\sigma_{l2}^2}} d\mu$$

where µ are the texel positions within a kernel of the bilateral filter, W is the intermediate colour estimate and $\hat{W}(x)$ represents the chrominance of the texel of the intermediate colour estimate at position x and luma(W(x)) represents the luminance of the intermediate colour estimate at texel position x, u is a normalization term, and wherein $\sigma_w$, $\sigma_{l1}$ and $\sigma_{l2}$ are parameters of the bilateral filter which can be adapted.

13. The method of claim 1 wherein said further shading estimate is determined by dividing the initial texture by said further colour estimate.

14. The method of claim 1 wherein the set of surface normals are determined by finding the normals which minimize an error metric comprising a measure of the difference between the further shading estimate and the global irradiance function.

15. The method of claim 14 wherein the error metric further comprises a regularization term which is a function of a difference between a proposed surface normal and a coarse surface normal predicted from the estimated scene geometry.

16. A computer program product configured to determine a colour component of a relightable texture and a set of surface normals for use in rendering an image from a rendering viewpoint under arbitrary lighting conditions, the computer program product being embodied on a non-transitory computer-readable storage medium and configured so as when executed on a processor to perform the method of claim 1.

17. A non-transitory computer readable storage medium having encoded thereon computer readable program code for generating a processing block configured to perform the method of claim 1.

18. Image processing apparatus configured to determine a colour component of a relightable texture and a set of surface normals for use in rendering an image from a rendering viewpoint under arbitrary lighting conditions, wherein at least one view of a scene from a respective at least one camera viewpoint represents the image, the image processing apparatus comprising:
   scene analysis logic configured to analyse the at least one view of the scene to estimate scene geometry and to segment an initial texture into a plurality of materials, the initial texture being separable into a colour estimate and a corresponding shading estimate;
   coarse colour estimation logic configured to determine an initial coarse colour estimate for each of the materials;
   scale factor determination logic configured to determine one or more scale factors, for scaling a respective one or more of the initial coarse colour estimates, the scaling logic being configured to determine the scale factors based on differences between irradiance estimates determined for the materials based on shading estimates which correspond with scaled versions of the initial coarse colour estimates of the materials;
   global irradiance determination logic configured to determine a global irradiance function for the scene using the determined scale factors;
   texture separation logic configured to use the global irradiance function and the initial texture to determine a further colour estimate and a corresponding further shading estimate, wherein the further colour estimate represents the colour component of the relightable texture; and
   surface normal determination logic configured to determine the set of surface normals using the global irradiance function and the further shading estimate.

19. The image processing apparatus of claim 18 further comprising a store configured to store the colour component of the relightable texture and the set of surface normals for subsequent use in rendering the image.

20. An image processing system configured to determine a colour component of a relightable texture and a set of surface normals for use in rendering an image from a rendering viewpoint under arbitrary lighting conditions, wherein at least one view of a scene from a respective at least one camera viewpoint represents the image, the image processing system comprising a memory storing program code and a processor block configured to:
   analyse the at least one view of the scene to estimate scene geometry and to segment an initial texture into a plurality of materials, the initial texture being separable into a colour estimate and a corresponding shading estimate;
   determine an initial coarse colour estimate for each of the materials;
   determine one or more scale factors, for scaling a respective one or more of the initial coarse colour estimates, the scale factors being determined based on differences between irradiance estimates determined for the materials based on shading estimates which correspond with scaled versions of the initial coarse colour estimates of the materials;
   determine a global irradiance function for the scene using the determined scale factors;

use the global irradiance function and the initial texture to determine a further colour estimate and a corresponding further shading estimate, wherein the further colour estimate represents the colour component of the relightable texture; and determine the set of surface normals using the global irradiance function and the further shading estimate.

* * * * *